United States Patent
Kim et al.

(10) Patent No.: US 12,475,886 B2
(45) Date of Patent: Nov. 18, 2025

(54) SYSTEM AND METHOD FOR SPEAKER VERIFICATION FOR VOICE ASSISTANT

(71) Applicant: Samsung Electronics Co., Ltd., Suwon-si (KR)

(72) Inventors: Myungjong Kim, Milpitas, CA (US); Taeyeon Ki, Milpitas, CA (US); Cindy Sushen Tseng, Santa Clara, CA (US); Srinivasa Rao Ponakala, Sunnyvale, CA (US); Vijendra Raj Apsingekar, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 261 days.

(21) Appl. No.: 18/047,609

(22) Filed: Oct. 18, 2022

(65) Prior Publication Data

US 2023/0419962 A1    Dec. 28, 2023

Related U.S. Application Data

(60) Provisional application No. 63/355,946, filed on Jun. 27, 2022.

(51) Int. Cl.
  *G10L 15/08*  (2006.01)
  *G10L 15/22*  (2006.01)

(52) U.S. Cl.
  CPC .............. *G10L 15/22* (2013.01); *G10L 15/08* (2013.01); *G10L 2015/088* (2013.01)

(58) Field of Classification Search
  CPC .... G10L 15/22; G10L 15/08; G10L 2015/088

(Continued)

(56) References Cited

U.S. PATENT DOCUMENTS 9,514,753 B2 * 12/2016 Sharifi ................... G10L 17/18
10,453,460 B1 * 10/2019 Wightman .............. G10L 15/10

(Continued)

FOREIGN PATENT DOCUMENTS

CN     111128134 A         5/2020
JP     2006171710 A   *   6/2006    ............. G10L 15/19

OTHER PUBLICATIONS

M. Hofmann and M. Lang, "Intention-based probabilistic phrase spotting for soeech understanding," Proceedings of 2001 International Symposium on Intelligent Multimedia, Video and Speech Processing. ISIMP 2001 (IEEE Cat. No. 01EX489), Hong Kong, China, 2001, pp. 99-102, doi: 10.1109/ISIMP.2001.925341. (Year: 2001).*

(Continued)

*Primary Examiner* — Bharatkumar S Shah

(57) ABSTRACT

A method includes obtaining audio data and identifying an utterance of a wake word or phrase in the audio data. The method also includes generating an embedding vector based on the utterance from the audio data and accessing a set of previously-generated vectors representing previous utterances of the wake word or phrase. The method further includes performing clustering on the embedding vector and the set of previously-generated vectors to identify a cluster including the embedding vector, where the identified cluster is associated with a speaker. The method also includes updating a speaker vector associated with the speaker based on the embedding vector and determining, using a speaker verification model, a similarity score between the updated speaker vector and the embedding vector. In addition, the method includes determining, based on the similarity score, whether a speaker providing the utterance matches the speaker associated with the identified cluster.

20 Claims, 11 Drawing Sheets

(58) Field of Classification Search
USPC .......................................................... 704/239
See application file for complete search history.

(56) References Cited

U.S. PATENT DOCUMENTS

| | | | |
|---|---|---|---|
| 10,535,361 | B2 | 1/2020 | Slapak |
| 11,200,884 | B1 | 12/2021 | Srinivasan et al. |
| 11,200,894 | B2* | 12/2021 | Smith .................... G06F 3/167 |
| 2008/0015858 | A1* | 1/2008 | Bossemeyer, Jr. ...... G10L 15/07 704/243 |
| 2015/0127342 | A1* | 5/2015 | Sharifi .................... G10L 17/18 704/239 |
| 2018/0082689 | A1* | 3/2018 | Khoury .................. G10L 17/00 |
| 2020/0168230 | A1 | 5/2020 | Roh et al. |
| 2021/0110832 | A1 | 4/2021 | Li et al. |
| 2021/0304774 | A1* | 9/2021 | Srinivasan ............. G10L 17/04 |
| 2021/0326421 | A1* | 10/2021 | Khoury .................. G10L 17/08 |
| 2021/0366491 | A1* | 11/2021 | Heigold .................. G10L 17/02 |
| 2021/0390959 | A1 | 12/2021 | Jain et al. |
| 2022/0038417 | A1* | 2/2022 | Ly .......................... G10L 17/22 |
| 2022/0058433 | A1 | 2/2022 | Han et al. |
| 2022/0093098 | A1 | 3/2022 | Samal et al. |

OTHER PUBLICATIONS

International Search Report and Written Opinion of the International Searching Authority dated Sep. 1, 2023, in connection with International Application No. PCT/KR2023/007543, 9 pages.

Brecht Desplanques, et al.; ECAPA-TDNN: Emphasized Channel Attention, Propagation and Aggregation in TDNN Based Speaker Verification; arXiv:2005.07143v3 [eess.AS]; Aug. 10, 2020; 5 pages.

Pranay Dighe, et al.; "Knowledge Transfer for Efficient On-device False Trigger Mitigation"; arXiv:2010.10591v1 [eess.AS]; Oct. 20, 2020; 5 pages.

Supplementary European Search Report dated Jan. 29, 2025, in connection with European Patent Application No. 23831749.9, 6 pages.

Notice of Allowance dated Jul. 22, 2025, in connection with European Application No. 23831749.9, 53 pages.

* cited by examiner

SYSTEM AND METHOD FOR SPEAKER VERIFICATION FOR VOICE ASSISTANT

CROSS-REFERENCE TO RELATED APPLICATION AND PRIORITY CLAIM

This application claims priority under 35 U.S.C. § 119(e) to U.S. Provisional Patent Application No. 63/355,946 filed on Jun. 27, 2022, which is hereby incorporated by reference in its entirety.

TECHNICAL FIELD

This disclosure relates generally to machine learning systems. More specifically, this disclosure relates to a system and method for speaker verification for a voice assistant.

BACKGROUND

Voice assistants such as BIXBY, SIRI, and ALEXA allow for voice enrollment by users as a step to collect a user voice profile. This involves requesting users to record user voice samples, which can be a tedious task and a stiff barrier against integrating new users. Consequently, to improve user experience and new user registration completion rates, a recent trend has been to not require users to carry out voice enrollment. Although this eliminates the tedious enrollment task, it can cause degradation of voice wake-up performance and increase the number of invalid wake-ups, which refer to instances where a voice assistant is activated although the user has not requested or intended for the voice assistant to do so.

SUMMARY

This disclosure relates to a system and method for speaker verification for a voice assistant.

In a first embodiment, a method includes obtaining, using at least one processing device of an electronic device, audio data. The method also includes identifying, using the at least one processing device, an utterance of a wake word or phrase in the audio data. The method further includes generating, using the at least one processing device, an embedding vector based on the utterance from the audio data. The method also includes accessing, using the at least one processing device, a set of previously-generated vectors representing previous utterances of the wake word or phrase. The method further includes performing, using the at least one processing device, clustering on the embedding vector and the set of previously-generated vectors to identify a cluster including the embedding vector, where the identified cluster is associated with a speaker. The method also includes updating, using the at least one processing device, a speaker vector associated with the speaker based on the embedding vector. The method further includes determining, using the at least one processing device and a speaker verification model, a similarity score between the updated speaker vector and the embedding vector. In addition, the method includes determining, using the at least one processing device and based on the similarity score, whether a speaker providing the utterance matches the speaker associated with the identified cluster.

In a second embodiment, an apparatus includes at least one processing device configured to obtain audio data. The at least one processing device is also configured to identify an utterance of a wake word or phrase in the audio data. The at least one processing device is further configured to generate an embedding vector based on the utterance from the audio data. The at least one processing device is also configured to access a set of previously-generated vectors representing previous utterances of the wake word or phrase. The at least one processing device is further configured to perform clustering on the embedding vector and the set of previously-generated vectors to identify a cluster including the embedding vector, where the identified cluster is associated with a speaker. The at least one processing device is also configured to update a speaker vector associated with the speaker based on the embedding vector. The at least one processing device is further configured to determine, using a speaker verification model, a similarity score between the updated speaker vector and the embedding vector. In addition, the at least one processing device is configured to determine, based on the similarity score, whether a speaker providing the utterance matches the speaker associated with the identified cluster.

In a third embodiment, a non-transitory computer readable medium contains instructions that when executed cause at least one processor to obtain audio data. The medium also contains instructions that when executed cause the at least one processor to identify an utterance of a wake word or phrase in the audio data. The medium further contains instructions that when executed cause the at least one processor to generate an embedding vector based on the utterance from the audio data. The medium also contains instructions that when executed cause the at least one processor to access a set of previously-generated vectors representing previous utterances of the wake word or phrase. The medium further contains instructions that when executed cause the at least one processor to perform clustering on the embedding vector and the set of previously-generated vectors to identify a cluster including the embedding vector, where the identified cluster is associated with a speaker. The medium also contains instructions that when executed cause the at least one processor to update a speaker vector associated with the speaker based on the embedding vector. The medium further contains instructions that when executed cause the at least one processor to determine, using a speaker verification model, a similarity score between the updated speaker vector and the embedding vector. In addition, the medium contains instructions that when executed cause the at least one processor to determine, using based on the similarity score, whether a speaker providing the utterance matches the speaker associated with the identified cluster.

In a fourth embodiment, a method includes training, using at least one processing device of an electronic device, a speaker verification model. The training includes providing a sample embedding vector based on an utterance from audio data, where the utterance includes a wake word or phrase. The training also includes providing, using the at least one processing device, a sample speaker vector. The training further includes receiving, using the at least one processing device from the speaker verification model, a result including a similarity score between the sample speaker vector and the sample embedding vector. In addition, the training includes using a loss function and modifying the speaker verification model based on the result.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate,"

as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
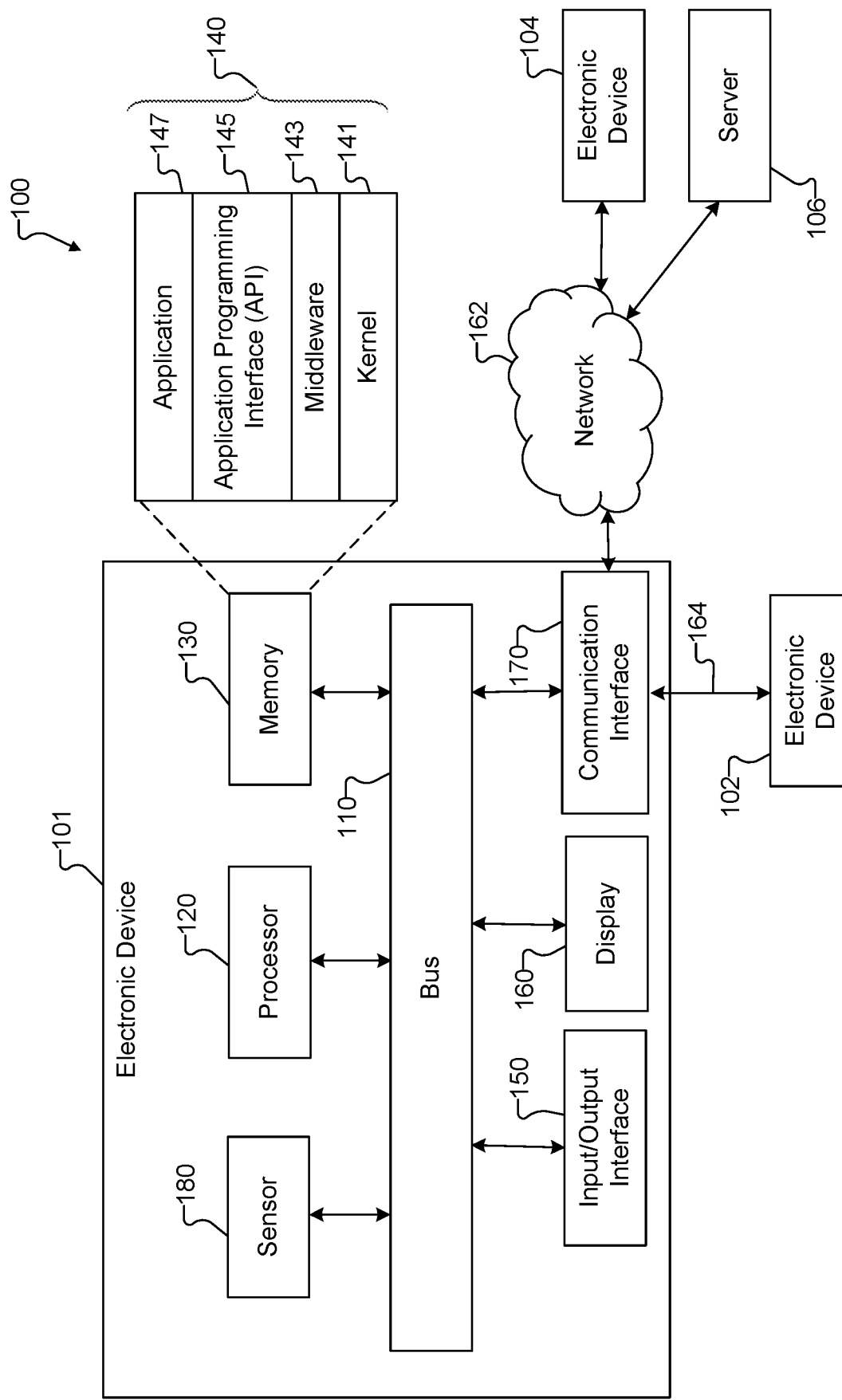
FIG. 1 illustrates an example network configuration including an electronic device in accordance with embodiments of this disclosure.

FIGS. 1 through 7C, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, voice assistants such as BIXBY, SIRI, and ALEXA allow for voice enrollment by users as a step to collect a user voice profile. This involves requesting users to record user voice samples, which can be a tedious task and a stiff barrier against integrating new users. Consequently, to improve user experience and new user registration completion rates, a recent trend has been to not require users to carry out voice enrollment. Although this eliminates the tedious enrollment task, it can cause degradation of voice wake-up performance and increase the number of invalid wake-ups, which refer to instances where a voice assistant is activated although the user has not requested or intended for the voice assistant to do so. For example, some data has shown that invalid wake-ups can account for over 50% of voice assistant invocations.

This disclosure provides techniques that help to overcome these types of issues by providing systems and methods for self-wake word speaker verification without needing users to go through an enrollment process while learning speaker voices to reduce invalid wake-ups. In various embodiments of this disclosure, these techniques can involve automatically finding a speaker vector of wake-words from arbitrary incoming audios to combine enrollment-less setup and speaker verification. Embodiments of this disclosure provide for automatically finding a speaker vector of wake-words from incoming audio, performing first and second stage embedding vector updates, and performing speaker verification using updated vectors. A keyword verification can be performed with a weak similarity threshold in the first stage, and speaker verification can be performed with a strong similarity threshold in the second stage.

In embodiments of this disclosure, clustering of an input embedding vector with prior speaker embedding vectors can be performed to determine whether a received utterance associated with the input embedding vector is similar to previously-received utterances. As additional utterances from the same speaker are received, the clustering can result in a larger number of clustered embedding vectors and can provide a more accurate speaker vector to use for speaker verification. The clustering result can also be used to determine whether to use the weak or strong similarity threshold. In various embodiments, an utterance can also be preprocessed to determine whether the utterance is an intentional or verified utterance, such as by leveraging one or both of a false-trigger mitigation model and an audio quality classification model. The false-trigger mitigation model can be used to determine whether the utterance was likely an intentional attempt to trigger the voice assistant or not, and the audio quality classification model can be used to determine whether the audio received is reliable or not. If a speaker is verified using the systems and methods of this disclosure, automated speech recognition (ASR), natural language understanding (NLU), or other models can be used to further carry out commands included within the utterance.

FIG. 1 illustrates an example network configuration 100 including an electronic device in accordance with embodiments of this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described below, the processor 120 may receive and process inputs (such as audio inputs or data received from an audio input device like a microphone) and perform speaker verification and/or automated speech recognition tasks using the inputs. The processor 120 may also instruct other devices to perform certain operations (such as outputting audio using an audio output device like a speaker) or display content on one or more displays 160. The processor 120 may further receive inputs (such as data samples to be used in training machine learning models) and manage such training by inputting the samples to the machine learning models, receive outputs from the machine learning models, and execute learning functions (such as loss functions) to improve the machine learning models.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications supporting the receipt of audio data, recognizing wake words in utterances included in the audio data, performing false-trigger mitigation using the audio data, performing audio quality classification using the audio data, performing speaker verification using the audio data, performing speech recognition on the utterances, and executing tasks related to the content of the utterances. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (TR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may receive and process inputs (such as audio inputs or data received from an audio input device like a microphone) and perform speaker verification and/or automated speech recognition tasks using the inputs. The server 106 may also instruct other devices to perform certain operations (such as outputting audio using an audio output device like a speaker) or display content on one or more displays 160. The server 106 may further receive inputs (such as data samples to be used in training machine learning models) and manage such training by inputting the samples to the machine learning models, receive outputs from the machine learning models, and execute learning functions (such as loss functions) to improve the machine learning models.

Although FIG. 1 illustrates one example of a network configuration 100 including an electronic device 101, various changes may be made to FIG. 1. For example, the network configuration 100 could include any suitable number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
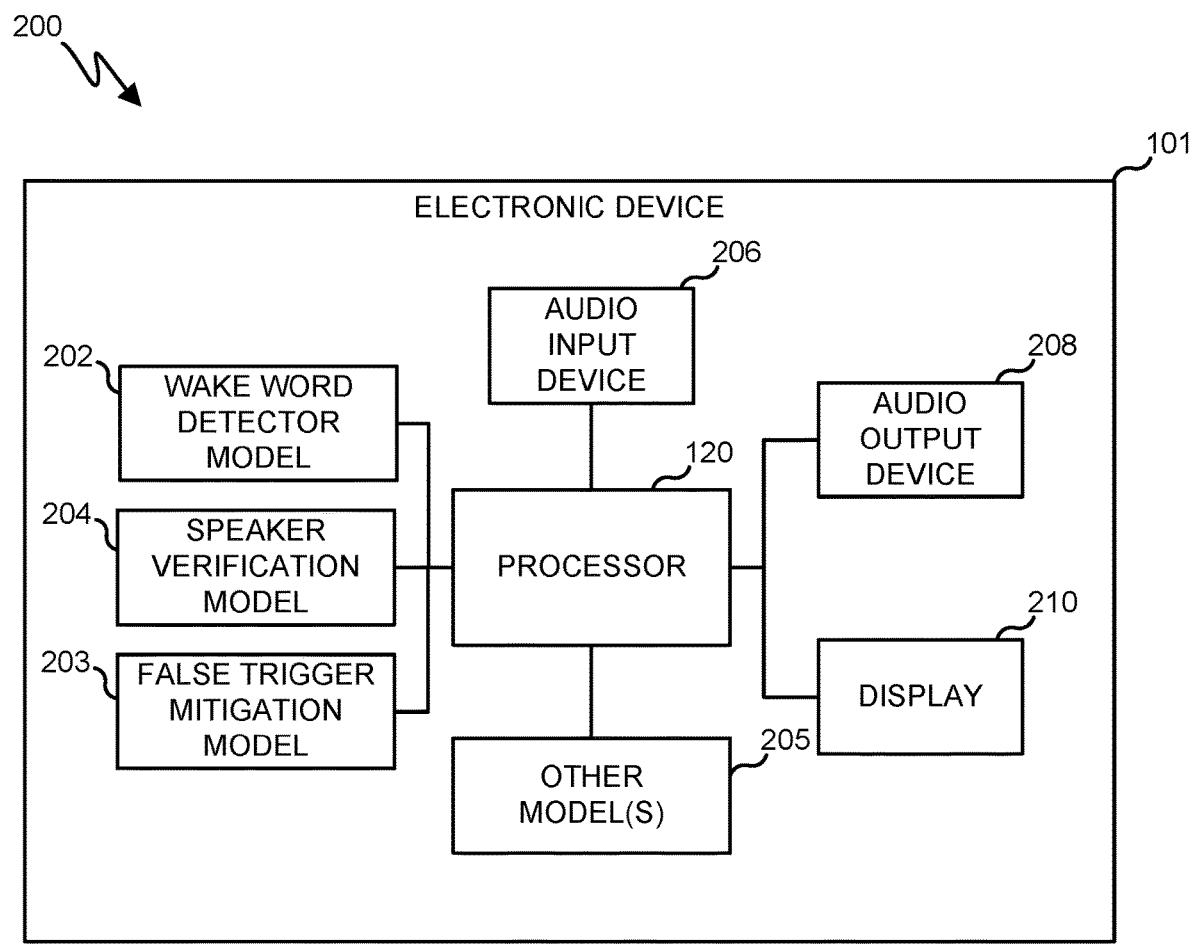
FIG. 2 illustrates an example wake word detection and speaker verification system in accordance with embodiments of this disclosure.

FIG. 2 illustrates an example wake word detection and speaker verification system 200 in accordance with embodiments of this disclosure. For ease of explanation, the system 200 is described as involving the use of the electronic device 101 in the network configuration 100 of FIG. 1. However, the system 200 may be used with any other suitable electronic device(s), such as the server 106, and in any other suitable system(s).

As shown in FIG. 2, the system 200 includes the electronic device 101, which includes the processor 120. The processor 120 is operatively coupled to or otherwise configured to use one or more machine learning models, such as a wake word detector model 202, a false-trigger mitigation model 203, and a speaker verification model 204. The wake word detector model 202 can be trained to recognize one or more wake words or phrases. In some embodiments, the wake word detector model 202 can include both (i) a frame-level detector model to detect and assign frame-level probabilities regarding whether frames of audio inputs include a wake word and (ii) a word-level verifier model to assign a word-level probability to an audio frame. Also, in some embodiments, the frame-level detector model and the word-level verifier model can be separate models. The speaker verification model 204 is used in various embodiments of this disclosure to determine whether an audio input is uttered by a verified speaker using enrollment-less processes as described here.

The processor 120 can also be operatively coupled to or otherwise configured to use one or more other models 205, such as an audio quality classification model, one or more ASR models, and/or one or more NLU models. It will be understood that the machine learning models 202-205 can be stored in a memory of the electronic device 101 (such as the memory 130) and accessed by the processor 120 to perform automated speech recognition tasks or other tasks. However, the machine learning models 202-205 can be stored in any other suitable manner.

The system 200 also includes an audio input device 206 (such as a microphone), an audio output device 208 (such as a speaker or headphones), and a display 210 (such as a screen or a monitor like the display 160). The processor 120 receives an audio input from the audio input device 206 and provides the audio input to the trained wake word detector model 202. The trained wake word detector model 202 detects whether a wake word or phrase is included in an utterance within the audio data and outputs a result to the processor 120, such as one or more predictions that the utterance includes the wake word or phrase. If a wake word or phrase is detected, the processor 120 provides the audio data to the false-trigger mitigation model 203, which analyzes acoustic features of the audio data in order to predict whether the user intended to trigger wake up of the voice assistant or if the utterance was a random utterance. In some embodiments, the processor 120 can also use the audio quality classification model of the other models 205 to determine whether the received audio input is of high enough quality for further processing. The processor 120, using the speaker verification model 204, can also generate an embedding vector from the audio data, perform clustering on the embedding vector and any embedding vectors from previously-received utterances, update a speaker vector associated with a speaker, and perform speaker verification to determine if the embedding vector associated with the received utterance is similar to the updated speaker vector.

If the processor 120 determines the embedding vector is similar to the speaker vector, such as if one or more probabilities is above a threshold, the processor 120 can instruct at least one action of the electronic device 101 or of another device or system. For example, in response to a positive detection of a wake word or phrase and speaker verification, the processor 120 may instruct one or more further actions that correspond to one or more instructions or requests provided in the utterance.

As a particular example, assume an utterance is received from a user via the audio input device 206 including a wake word or phrase (such as "hey BIXBY, call mom"). Here, the trained wake word detector model 202 detects the presence of the wake word "BIXBY" or phrase "hey, BIXBY," the speaker is verified using the trained speaker verification model 204, and the processor 120 instructs the audio output device 208 to output "calling Mom." The processor 120 also causes a phone application or other communication application to begin a communication session with a "mom" contact stored on the electronic device 101 or otherwise in association with the user of the electronic device 101. As another particular example, suppose an utterance of "hey BIXBY, start a timer" is received. The trained wake word detector model 202 may detect the presence of the wake word "BIXBY" or phrase "hey, BIXBY," the speaker may be verified using the trained speaker verification model 204, and the processor 120 may instruct execution of a timer application and display of a timer on the display 210 of the electronic device 101.

In various embodiments, it will be understood that trained machine learning models such as the wake word detector model 202 and the speaker verification model 204 can operate to detect whether a wake word or phrase is in an utterance and whether a known speaker provided the utterance. Based on that determination, the utterance may or may not be provided to another machine learning model (such as an automated speech recognition model) for further processing of the utterance in order to recognize the command being given by the user. Also, in various embodiments, the wake word detector model 202 and the speaker verification model 204, as well as other models such as the false-trigger mitigation and audio quality classification models, act as gatekeepers to provide a lightweight solution for detecting if a wake word or phrase is even present in an utterance and whether a known speaker provided the utterance before committing additional resources to processing the utterance by the electronic device 101.

Although FIG. 2 illustrates one example of a wake word detection and speaker verification system 200, various changes may be made to FIG. 2. For example, the audio input device 206, the audio output device 208, and the display 210 can be connected to the processor 120 within the electronic device 101, such as via wired connections or circuitry. In other embodiments, the audio input device 206, the audio output device 208, and the display 210 can be external to the electronic device 101 and connected via wired or wireless connections. Also, in some cases, the wake word detector model 202, the false-trigger mitigation model 203, and the speaker verification model 204, as well as one or more of the other machine learning models 205, can be stored as separate models called upon by the processor 120 to perform certain tasks or can be included in and form a part of one or more larger machine learning models. Further, in some embodiments, one or more of the machine learning models, including the wake word detector model 202, the false-trigger mitigation model 203, the speaker verification model 204, and one or more of the other machine learning models 205, can be stored remotely from the electronic device 101, such as on the server 106. Here, the electronic device 101 can transmit requests including inputs (such as captured audio data) to the server 106 for processing of the inputs using the machine learning models, and the results can be sent back to the electronic device 101. In addition, in some embodiments, the electronic device 101 can be replaced by the server 106, which receives audio inputs from a client device and transmits instructions back to the client device to execute functions associated with instructions included in utterances.

Figure 3:
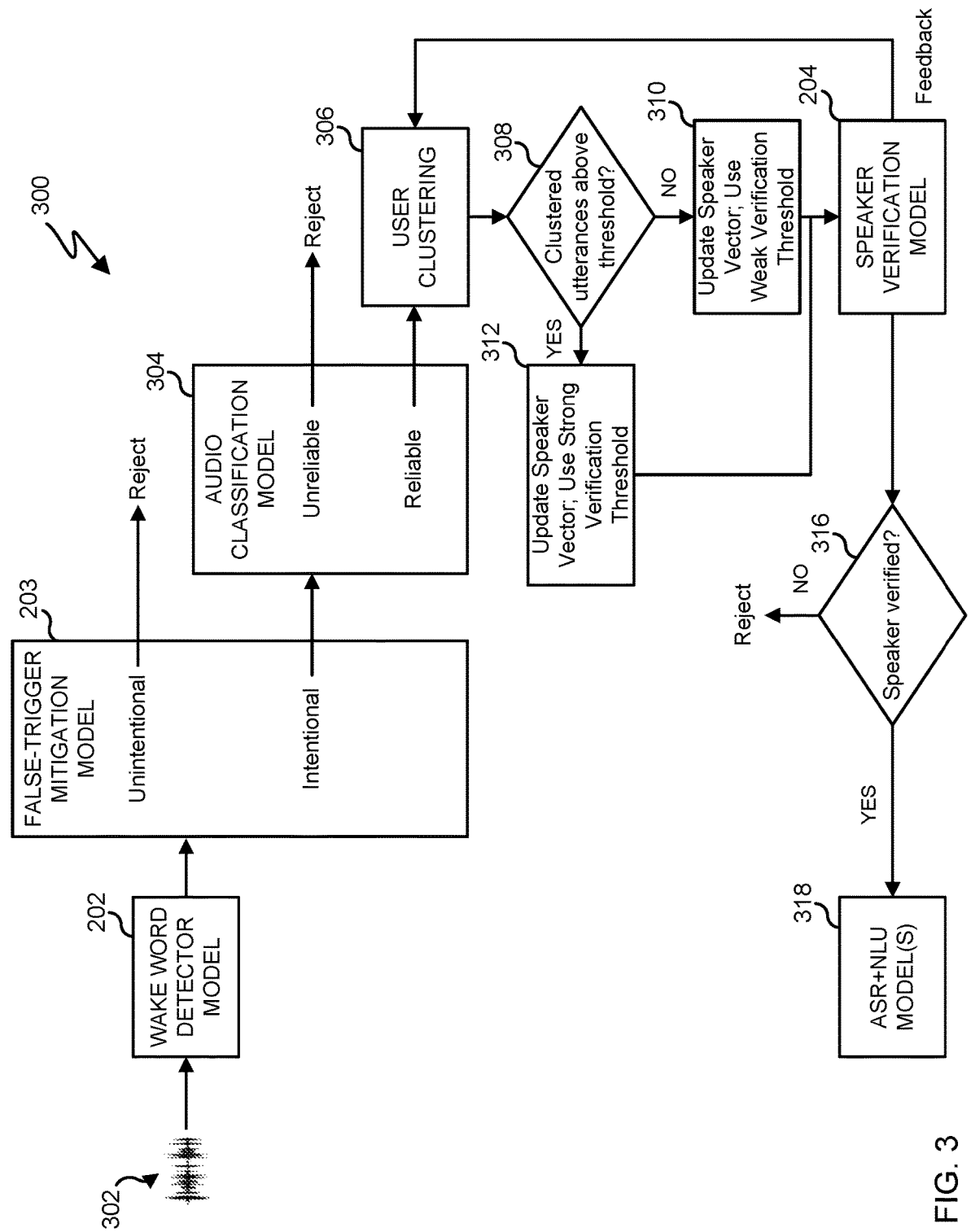
FIG. 3 illustrates an example speaker verification process in accordance with embodiments of this disclosure.

FIG. 3 illustrates an example speaker verification process 300 in accordance with embodiments of this disclosure. For ease of explanation, the process 300 is described as involving the use of the electronic device 101 in the network configuration 100 of FIG. 1. However, the process 300 may be used with any other suitable electronic device (such as the server 106) or a combination of devices (such as the electronic device 101 and the server 106) and in any other suitable system(s).

As shown in FIG. 3, the process 300 includes the wake word detector model 202. The wake word detector model 202 receives an audio input 302, such as audio data received via an audio input device coupled to an electronic device that uses the wake word detector model 202 and other models used in the process 300. For example, the audio input 302 may include a wake up command (such as "Hey BIXBY") that triggers the process 300. In various embodiments, the wake word detector model 202 continuously listens for utterances and attempts to predict if an utterance includes a wake word or phrase. Once the wake word detector model 202 classifies an utterance as potentially including a wake word or phrase, the wake word detector model 202 passes at least a portion of the audio input 302 to the false-trigger mitigation model 203.

The false-trigger mitigation model 203 analyzes acoustic characteristics of the audio input 302 to determine whether the utterance is classified as an intentional wake up command or an unintentional wake up command, such as based on a probability that the utterance is intentional being greater than an intention threshold value. For example, the audio input 302 to the false-trigger mitigation model 203 can be a command word or phrase after the wake-word in the utterance. For example, if the utterance includes "Hi BIXBY," and, after that, includes the user saying "call mom," then the utterance according to "call mom" is the input to the false-trigger mitigation model 203 in this example. The false-trigger mitigation model 203 then analyzes the command utterance to see if the user intended to wake up the assistant or not. If the detected wake up command is unintentional, the utterance is rejected, and the process 300 ends to wait for a new audio input 302 to be received. If the detected wake up command is determined to be intentional, then, in some embodiments, only the wake-word utterance is used to extract a speaker embedding vector. Additionally, if the wake up command is determined to be intentional, at least a portion of the audio input 302 can be provided to an audio quality classification model 304. In some embodiments, the process 300 may not use the audio quality classification model 304, and use of the audio quality classification model 304 can be an optional step to filter out audio inputs 320 that are below a quality threshold (such as those that are too noisy) in order to ensure that good quality embedding vectors can be extracted from good quality audio.

In embodiments using the audio quality classification model 304, the audio quality classification model 304 is used to analyze the audio data and determine whether the audio data is reliable or unreliable, such as based on determining whether an audio quality score for the audio data is greater than an audio quality threshold. If it is determined using the audio quality classification model 304 that the audio data is unreliable, the utterance is rejected, and the process 300 ends to wait for a new audio input 302 to be received. If the audio is determined to be reliable, the audio data is provided to a user clustering step 306, which can be performed as part of the tasks associated with the speaker verification model 204. In this way, the false-trigger mitigation model 203 and the audio quality classification model 304 act as gatekeepers to ensure the audio input 302 is adequate for further speaker verification processing.

At the user clustering step 306, a speaker embedding vector is generated or extracted from the wake word utterance included in the audio input 302. At step 306, a set of previously-generated speaker vectors representing previous utterances of the wake word or phrase are accessed. These previous speaker vectors and the newly-extracted speaker embedding vector are clustered to identify one or more clusters of vectors, where the clustering reveals clustered vectors with similar features. Thus, the vectors in a cluster have a high likelihood of representing utterances made by a same speaker. In various embodiments, the vectors are clustered using spectral clustering, which makes use of a spectrum (eigenvalues) of a similarity matrix of the audio data to perform dimensionality reduction before clustering in fewer dimensions. The similarity matrix can be provided as an input and may represent a quantitative assessment of the relative similarity of each pair of points in the dataset. However, other clustering methods could be used, such as K-means clustering.

At step 308 of the process 300, it is determined whether the number of speaker embedding vectors associated with a cluster is above a threshold, such as a threshold of five, ten, or fifteen speaker embedding vectors (although any suitable number can be used for the threshold). In this example, the process 300 includes two-stage update and verification steps depending on whether the number of clustered vectors is above the threshold. As shown in FIG. 3, if the number of clustered utterance vectors is below the threshold, at step 310, a speaker vector associated with the speaker of the clustered utterance vectors is updated using the new speaker embedding vector, and a verification (or similarity) threshold is set as a weaker threshold (such as a lower threshold value like a value between 0.01-0.1). If the number of clustered utterance vectors is at or above the threshold, at step 312, the speaker vector is updated using the new speaker embedding vector, and the verification threshold is set as a stronger threshold (such as a higher threshold value like a value between 0.3-0.4). The updated speaker vector and the new embedding vector are used by the speaker verification model 204 to determine a similarity score between the updated speaker vector and the new embedding vector. The speaker verification model 204 compares the similarity score with the similarity threshold that was set at either step 310 or 312 to determine whether a speaker providing the audio input 302 matches the speaker associated with the identified cluster.

In various embodiments, when the lower first value is used for the similarity threshold value, the determining of the similarity score may essentially be performed using keyword verification in order to detect similarities between the wake word or phrase in the speaker vector and in the embedding vector. Also, in various embodiments, when the higher second value is used for the similarity threshold value, the determining of the similarity score may essentially be performed using speaker verification to detect similarities between speaker voice characteristics of the speaker providing the utterance and the speaker associated with the identified cluster.

As shown in FIG. 3, the speaker verification model 204 can provide feedback in the form of additional embedding vectors to be used in subsequent clustering at step 306. In this way, over time, the process 300 can become more accurate in determining whether an utterance belongs to a particular user. This is because utterances from previous wake word detection and speaker verification processes can be used as feedback for subsequent wake word detection and speaker verification processes. That is, by collecting more speaker embedding vectors per individual speaker, the speaker verification model becomes more robust and accurate because (by switching from the weak similarity threshold to the strong similarity threshold) speaker embedding vectors closest to a centroid point of the cluster can be collected. Once all speaker embedding vectors are close enough (such as five vectors, although this number may be adjustable) to the cluster's centroid, other speaker embedding vectors farther away from the centroid point can be pruned, leaving the top five speaker embedding vectors for each cluster to be kept for future inferencing.

Based on the comparison performed by the speaker verification model 204, at step 316, it is determined whether the speaker that provided the audio input 302 is a verified speaker. If the speaker is not verified, the process 300 ends. If the speaker is verified, one or more further actions can be instructed for execution by the electronic device. For example, the utterance may be transferred to one or more on-device or server-side ASR/NLU models 318, and subsequently at least one command included in the utterance can be fulfilled. For instance, the ASR/NLU model(s) 318 can be used by the electronic device to further process the audio input 302 or subsequent audio inputs and determine at least one command issued in the utterance, such as starting a timer, creating a reminder, initiating a phone call, etc. The electronic device can execute the determined command(s). Thus, if a wake word or phrase is detected and a speaker is verified in the process 300, the electronic device can further process the utterance using the ASR/NLU model(s) 318 and instruct at least one action of the electronic device 101 or of another device or system according to the command(s) issued by the user.

Although FIG. 3 illustrates one example of a speaker verification process 300, various changes may be made to FIG. 3. For example, data is illustrated in FIG. 3 as being passed from one model to another. However, it will be understood that inputs (such as the audio input 302) can be received by a processor (such as the processor 120) and provided to the appropriate machine learning models. Similarly, outputs from the machine learning models can be received by the processor 120 and passed to one or more other appropriate machine learning models. In some embodiments, the speaker verification model 204 may be used to perform all of steps 306-316. In other embodiments, the processor 120 may perform steps 306-310, and the speaker verification model 204 may be used to perform steps 314-316 using the similarity threshold set by the processor 120 at either step 310 or 312. In still other embodiments, the speaker verification model 204 may not be used to perform the comparison at step 316 but may only output the similarity score, and the processor 120 may perform the comparison using the similarity score output by the speaker verification model 204 and based on the similarity threshold determined using the number of utterances for the speaker (such as based on a clustering result as described in the embodiments of this disclosure).

The process 300 may also be performed using a distributed architecture. For instance, the speaker verification model 204, the false-trigger mitigation model 203, and the audio quality classification model 304 can be executed on a client electronic device (such as electronic device 101) or at a server (such as server 106). In various embodiments, the ASR/NLU model(s) 318 can also be executed by the electronic device or by the server. When executed by the server, the server may provide the client electronic device with the determined action(s) to be performed by the client electronic device. In some embodiments, self-wake word verification can be performed by a server (such as the server 106), the client electronic device can provide audio data received via an audio input device of the client electronic device to the server, and the speaker verification model 204, the false-trigger mitigation model 203, the audio quality classification model 304, and the ASR/NLU model(s) 318 can be executed by the server based on the audio data provided from the client electronic device.

In addition, in some embodiments, additional steps can be performed to verify whether a valid wake up based on the speaker was performed. For example, after the process 300 shown in FIG. 3 is performed, further steps can be performed, such as issuing a prompt to a user of the electronic device to ask the current user if the latest utterance was from that user. In some cases, the user can also be determined or weighted based on a most active user of the electronic device. Also, in some cases, predictions can take into account voice assistant use patterns, such as if a particular user is allowed to unlock the electronic device. The speaker verification of the various embodiments of this disclosure have been shown to drastically reduce the number of invalid wake-ups, in some instances with up to a 99.9% success rate.

Figure 4:
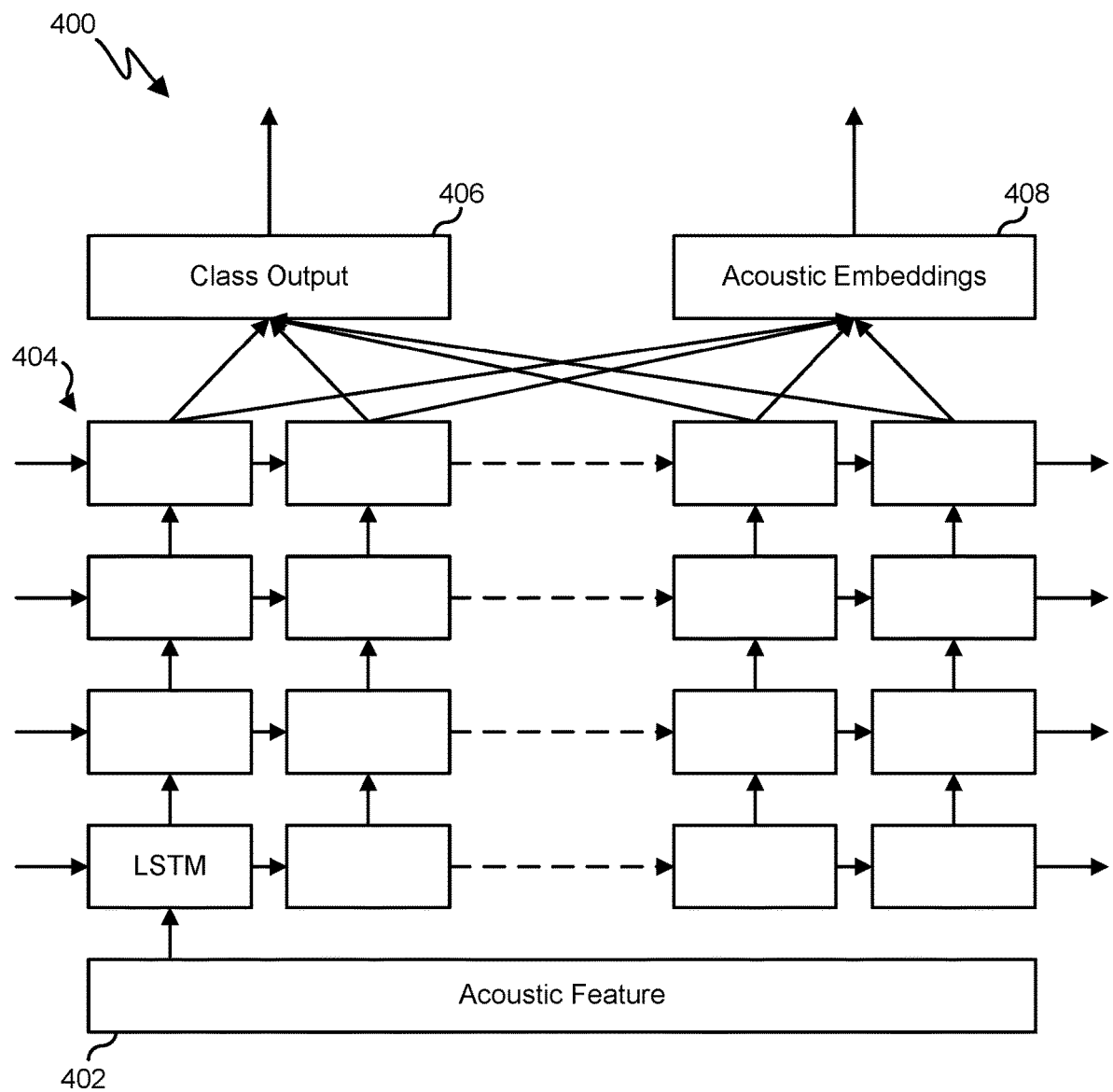
FIG. 4 illustrates an example false-trigger mitigation model architecture in accordance with embodiments of this disclosure.

FIG. 4 illustrates an example false-trigger mitigation model architecture 400 in accordance with embodiments of this disclosure. For ease of explanation, the false-trigger mitigation model architecture 400 is described as involving the use of the electronic device 101 in the network configuration 100 of FIG. 1. However, the false-trigger mitigation model architecture 400 may be used with any other suitable electronic device (such as the server 106) or a combination of devices (such as the electronic device 101 and the server 106) and in any other suitable system(s). Also, in various embodiments, the false-trigger mitigation model architecture 400 can be used as at least part of the false-trigger mitigation model 203 described in embodiments of this disclosure.

As shown in FIG. 4, in this example embodiment, the false-trigger mitigation model architecture 400 can be arranged with four-layer long short-term memory (LSTM)-based acoustic embeddings. The false-trigger mitigation model architecture 400 receives an acoustic feature 402 as an initial input to a plurality of LSTM cells 404. The LSTM cells 404 use feedback connections to process variable-length sequences of inputs in a recurrent manner, and acoustic embeddings focus on low-level information such as the presence of speech, background noise, and acoustic environment.

The final layer of the false-trigger mitigation model architecture 400 generates a class output 406 and an acoustic embedding 408. The class output 406 indicates whether the acoustic features 402 should be accepted or rejected. For example, in embodiments of this disclosure, the class output 406 may indicate whether an utterance is intentional or unintentional. Also, in various embodiments of this disclosure, the output acoustic embedding 408 can be used during training of the false-trigger mitigation model architecture 400, while the output acoustic embedding 408 can be discarded during inferencing. In various embodiments, during training, the output acoustic embedding can be used to estimate acoustic embeddings from an external pre-trained model.

Although FIG. 4 illustrates one example of a false-trigger mitigation model architecture 400, various changes may be made to FIG. 4. For example, the false-trigger mitigation model architecture 400 could include any suitable number of LSTM cells in any suitable arrangement. Also, although FIG. 4 illustrates the false-trigger mitigation model architecture 400 as an LSTM machine learning model, other architectures could be used for the false-trigger mitigation model architecture 400. In general, machine learning models and architectures can come in a wide variety of configurations, and FIG. 4 does not limit the scope of this disclosure to any particular configuration.

Figure 5A:
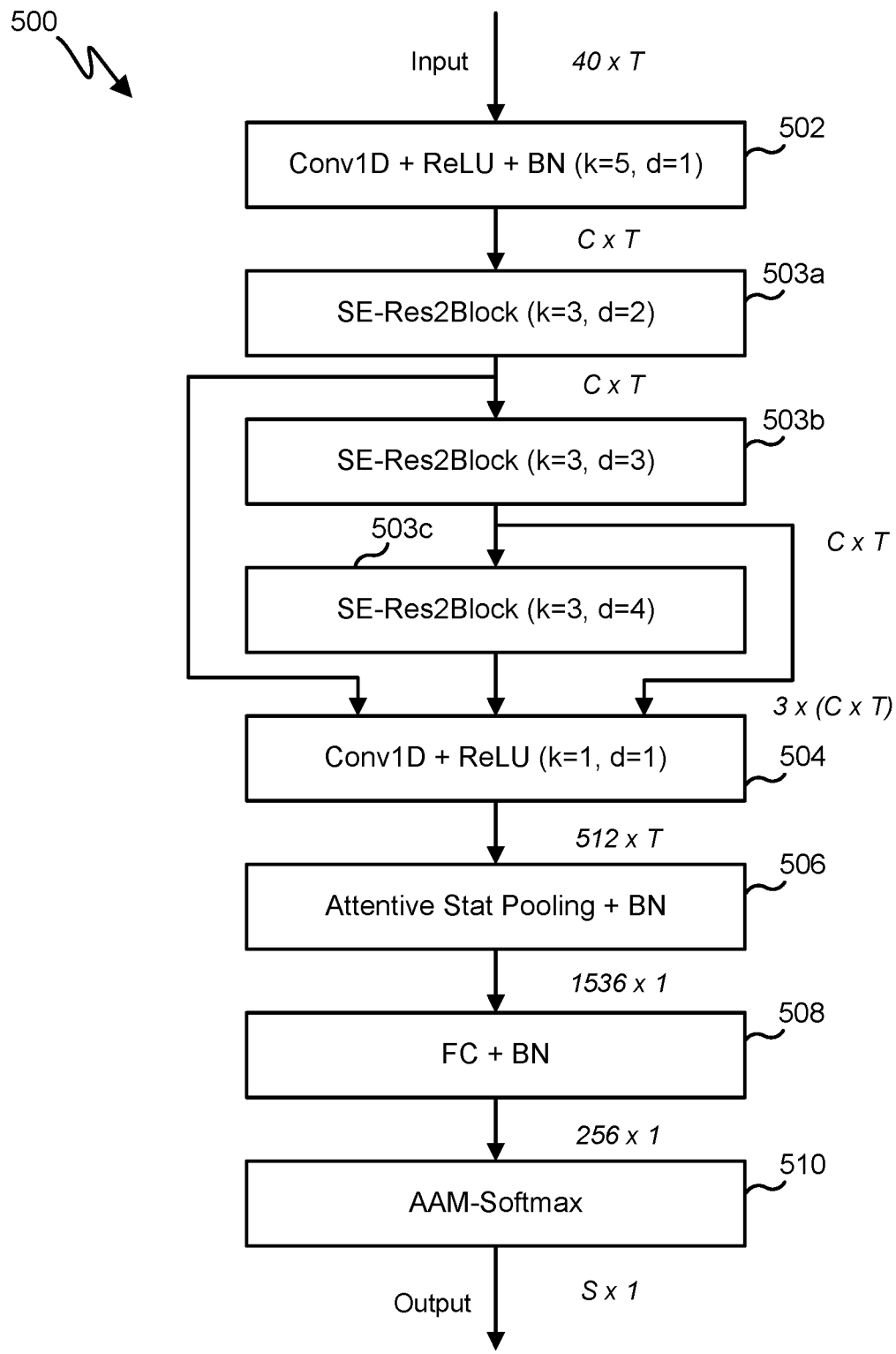
FIGS. 5A and 5B illustrate an example architecture for speaker vector extraction and/or for audio quality classification in accordance with embodiments of this disclosure.
Figure 5B:
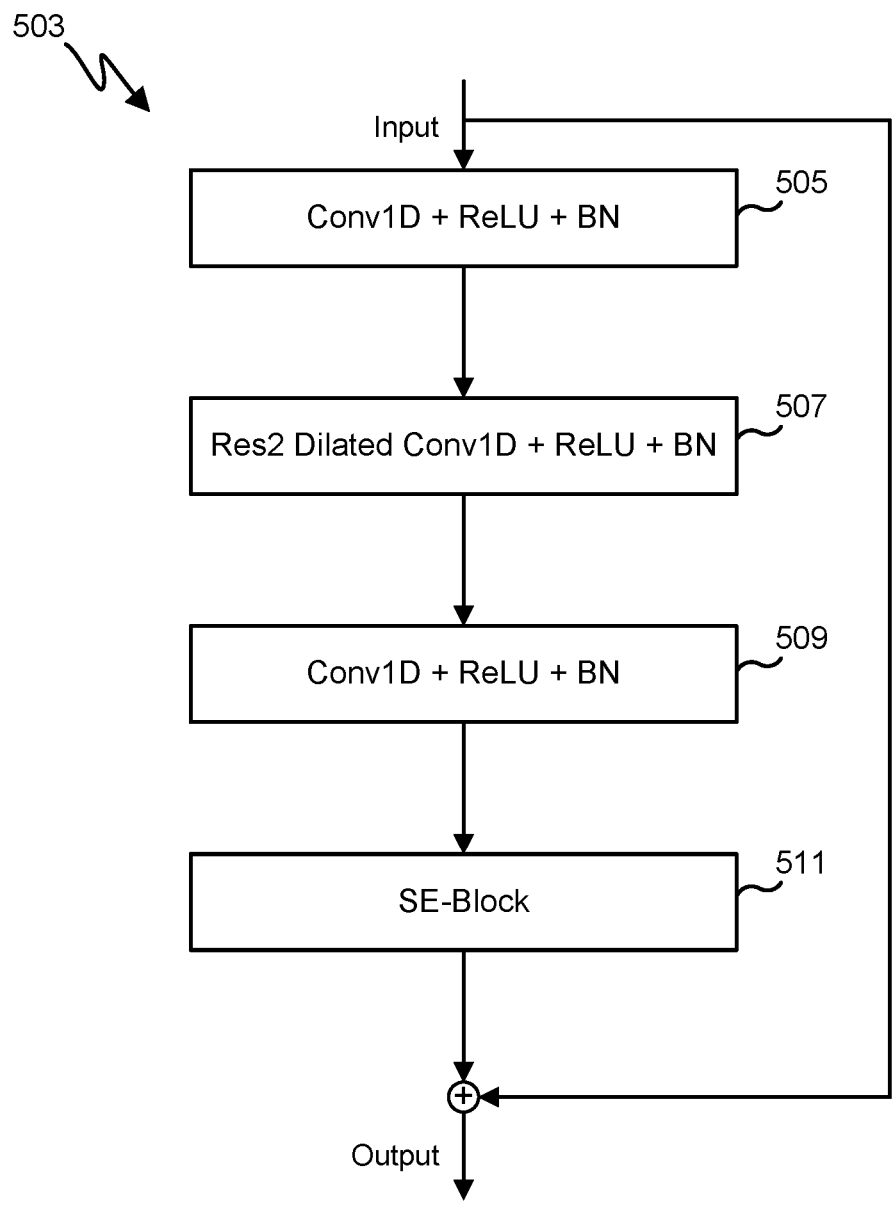

FIGS. 5A and 5B illustrate an example architecture 500 for speaker vector extraction and/or for audio quality classification in accordance with embodiments of this disclosure. For ease of explanation, the architecture 500 is described as involving the use of the electronic device 101 in the network configuration 100 of FIG. 1. However, the architecture 500 may be used with any other suitable electronic device (such as the server 106) or a combination of devices (such as the electronic device 101 and the server 106) and in any other suitable system(s).

As shown in FIG. 5A, in this example embodiment, the architecture 500 can include an Emphasized Channel Attention, Propagation and Aggregation Time Delay Neural Network (ECAPA-TDNN) configuration that applies statistics pooling to project variable-length utterances into fixed-length speaker characterizing embeddings. In various embodiments, the architecture 500 can be used as at least part of the speaker verification model 204 and/or as at least part of the audio quality classification model 304 described in embodiments of this disclosure. The difference between using the architecture 500 for the audio quality classification model and for the speaker verification and/or speaker embedding extraction model involves using different training datasets and labels for the respective models. For audio quality classification model training, both clean data and noisy data may be used in order to train the audio quality classification model how to classify audio data as either clean or noisy (reliable or unreliable). For the speaker verification and/or speaker embedding extraction model training, speaker samples containing or not containing wake words or phrases may be used to train the model to speaker verification and/or speaker embedding extraction model to recognize and extract speaker embeddings for audio data. Additionally, audio samples with labelled speaker IDs can be used during training of speaker verification and speaker embedding extraction model training.

The architecture 500 includes a convolutional layer 502 that takes input features of a particular dimension, such as 40-dimensional Mel-frequency cepstral coefficients (MFCC) feature vectors. The convolutional layer 502 performs one-dimensional convolution (Conv1D), rectified linear unit (ReLU), and batch normalization (BN) operations using the input features. In this example, k=5 and d=1, where k denotes the kernel size and d denotes the dilation spacing of the Conv1D layers or of the Squeeze and Excitation (SE) Res2Blocks (SE-Res2Blocks). As shown in FIG. 5A, the output from the convolution layer 502 is received at block 503a, where C corresponds to the channel and T corresponds to the temporal dimension of intermediate feature maps. Block 503a is an SE-Res2Block that is used to scale frame-level features of the audio inputs given global properties of the recording. In the example of FIG. 5A, three SE-Res2Blocks are included in the architecture 500 at blocks 503a-503c. As shown in FIG. 5A, k=3 and d=2 for block 503a, k=3 and d=3 for block 503b, and k=3 and d=4 for block 503c.

An example configuration 503 of the blocks 503a-503c is shown in FIG. 5B. Here, the configuration 503 includes block 505 at which the SE-Res2Block performs Conv1D, ReLU, and BN operations on the input from the previous layer. At block 507, dilated Conv1D, ReLU, and BN operations are performed, followed by additional Conv1D, ReLU, and BN operations at block 509. The task of the dilated convolutional layers is to gradually build up the temporal context. An SE-Block 511 is used to expand the temporal context of the frame layer by rescaling the channels according to global properties of the recording. The configuration 503 enhances the central convolutional layer so that it can process multi-scale features by constructing hierarchical residual-like connections within, which can improve performance while significantly reducing the number of model parameters.

Referring again to FIG. 5A, the outputs from each of the SE-Res2Block blocks 503a-503c are provided to a next convolutional layer 504, which performs additional Conv1D and ReLU operations (such as with k=1 and d=1). At block 506, attentive stat pooling and BN is performed (such as with 512 channels×T). At block 508, a fully-connected layer with BN is used (such as with the channel number set to 1536 channels). At block 510, an additive angular margin (AAM) softmax function is executed (such as with the channel number set to 256) as the activation function to provide a final output, where S is the number of training speakers. For example, speaker embeddings can be extracted from the final fully-connected layer and used in performing additional speaker verification tasks.

Although FIGS. 5A and 5B illustrate one example of an architecture 500 for speaker vector extraction and/or for audio quality classification, various changes may be made to FIGS. 5A and 5B. For example, when the architecture 500 is used for speaker vector embedding extraction, the architecture 500 can be at least part of the speaker verification model 204 or can be part of a separate speaker embedding extraction model that extracts speaker embeddings for use by the speaker verification model 204. Also, although FIGS. 5A and 5B illustrate the architecture 500 as having an ECAPA-TDNN configuration, other appropriate configurations could be used for the architecture 500. In general, machine learning models and architectures can come in a wide variety of configurations, and FIGS. 5A and 5B do not limit the scope of this disclosure to any particular configuration.

Figure 6A:
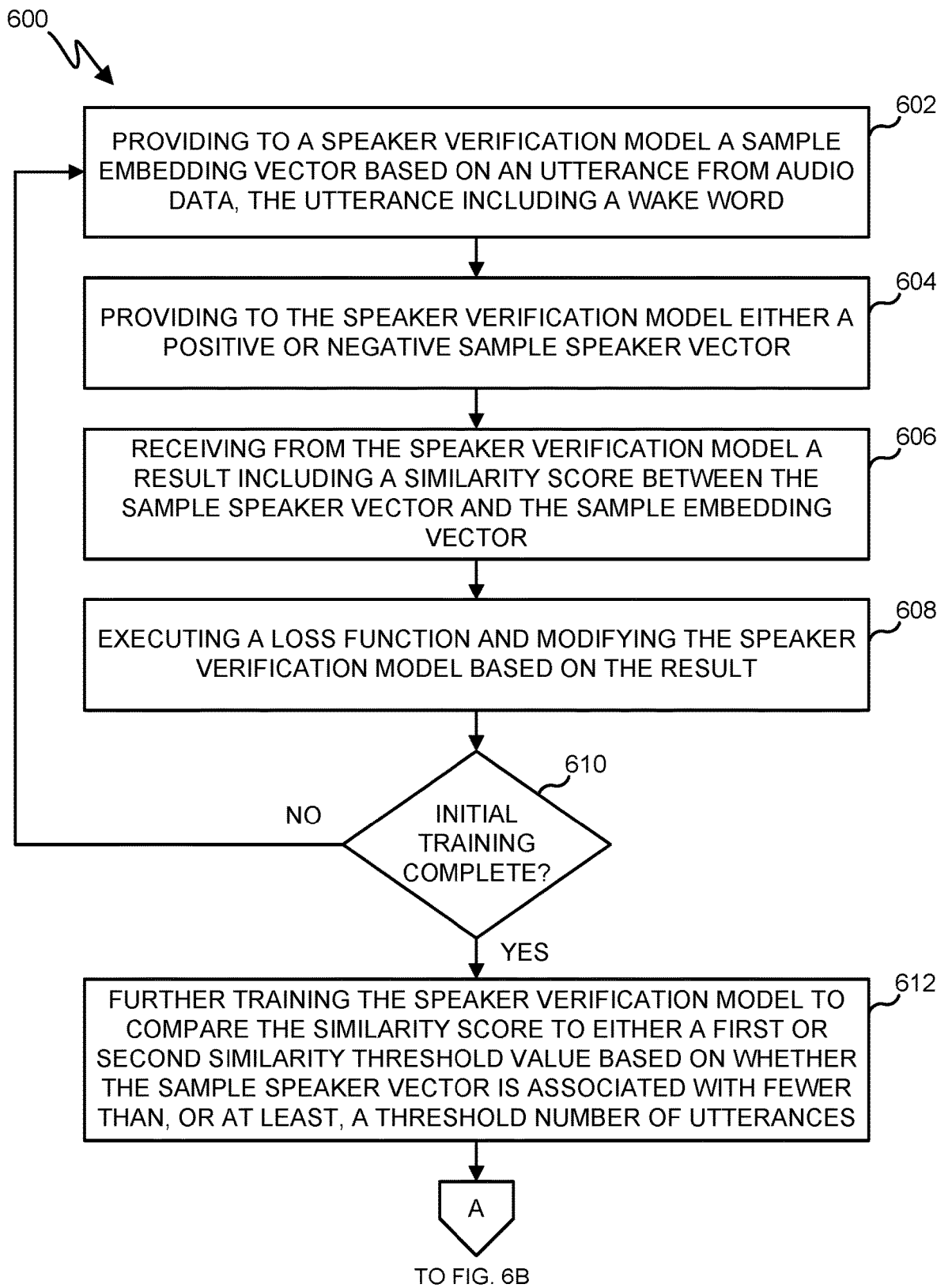
FIGS. 6A and 6B illustrate an example method for performing enrollment-less speaker verification training in accordance with embodiments of this disclosure.
Figure 6B:
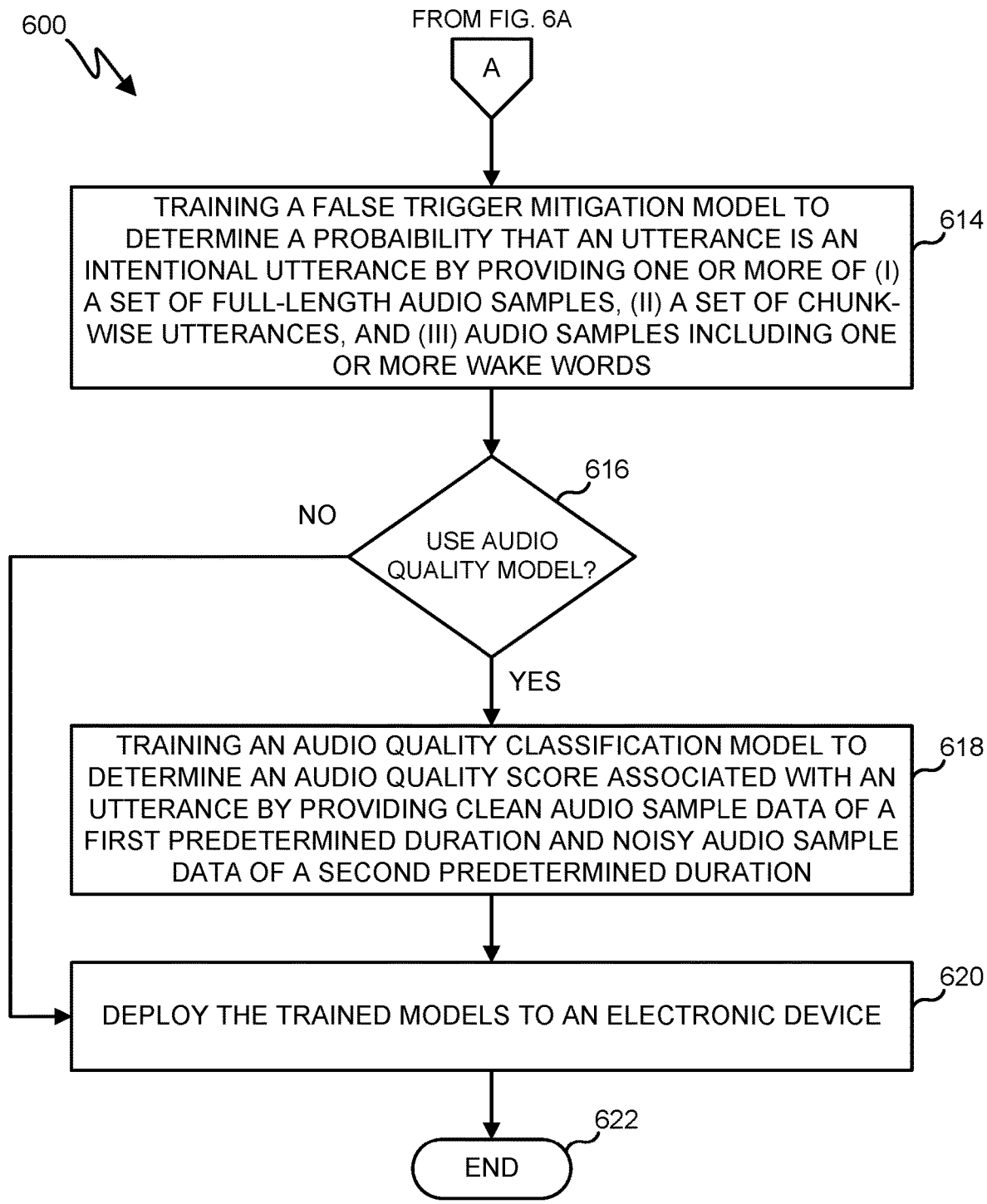

FIGS. 6A and 6B illustrate an example method 600 for performing enrollment-less speaker verification training in accordance with embodiments of this disclosure. For ease of explanation, the method 600 shown in FIGS. 6A and 6B is described as being performed using the server 106 in the network configuration 100 of FIG. 1. As a particular example, the method 600 can be executed on the server 106 in the network configuration 100 of FIG. 1, and trained machine learning models (such as a trained wake word detector model 202, a trained speaker verification model 204, a trained false-trigger mitigation model 203, and a trained audio quality classification model 304) can be deployed to a client electronic device 101 for use. However, the method 600 may be used with any other suitable device (s), such as the electronic device 101, and in any other suitable system(s).

To train the various machine learning models, the processor 120 of the server 106 provides various training data to the machine learning models. The training data typically includes training input data and known ground truths, where the training input data is provided to a machine learning model for processing and the ground truths represent the expected outputs of the machine learning model. At block 602, the processor provides a sample embedding vector based on an utterance included in sample audio data to a speaker verification model, such as the speaker verification model 204. In some embodiments, the utterance includes a wake word or phrase. At block 604, the processor provides a sample speaker vector to the speaker verification model, where the sample speaker vector represents one or more utterances associated with a speaker or user. During the training of the speaker verification model, the sample speaker vector can be a positive or negative sample. For example, if providing a positive training sample for the particular round of training, the speaker vector can represent an utterance by a speaker that includes a wake word or phrase. If providing a negative training sample for the particular round of training, the speaker vector represents an utterance by a speaker that does not include the wake word or phrase. As another example, the sample speaker vector can be positive or negative based on whether the speaker vector is from a same speaker as the sample embedding vector or a different speaker.

At block 606, the processor receives a result or output including a similarity score between the sample speaker vector and the sample embedding vector from the speaker verification model. At block 608, the processor, based on the output from the speaker verification model, determines an error or loss using a loss function and modifies the speaker verification model based on the error or loss. The outputs of the speaker verification model produced using the training input data can represent confidences, such as the similarity score, and can be provided to a loss function. The loss function calculates the error or loss associated with the speaker verification model's predictions. For example, when the outputs of the speaker verification model differ from the ground truths, the differences can be used to calculate a loss as defined by the loss function. The loss function may use any suitable measure of loss associated with outputs generated by the speaker verification model, such as a cross-entropy loss or a mean-squared error.

At decision block 610, the processor determines whether the initial training of the speaker verification model is complete, meaning whether the speaker verification model is predicting speaker similarity using the input training data at an acceptable accuracy level. When the loss calculated by the loss function is larger than desired, the parameters of the speaker verification model can be adjusted. Once adjusted, the method 600 moves back to block 602 to provide the same or additional training data to the adjusted speaker verification model, and additional outputs from the speaker verification model can be compared to the ground truths so that additional losses can be determined using the loss function. Ideally, over time, the speaker verification model produces more accurate outputs that more closely match the ground truths, and the measured loss becomes less. The amount of training data used can vary depending on the number of training cycles and may include large amounts of training data (such as 9,375 hours of data containing 10,001 speaker samples). At some point, the measured loss can drop below a specified threshold at decision block 610, the initial training of the speaker verification model can be completed, and the method 600 moves to block 612.

At block 612, the processor further trains the speaker verification model to compare the similarity score to a similarity threshold value. In various embodiments of this disclosure, different similarity threshold values can be used based on a number of speaker utterances being associated with fewer, equal to, or greater than a threshold number of utterances. During the training method 600, the speaker verification model can be trained to use the threshold based on the sample data to use either a first value for the similarity threshold value (based on the sample speaker vector being associated with fewer than a threshold number of utterances) or a second value greater than the first value for the similarity threshold value (based on the sample speaker vector being associated with at least the threshold number of utterances).

At block 614, the processor trains a false-trigger mitigation model, such as the false-trigger mitigation model 203, to determine a probability that an utterance is an intentional utterance. To train the false-trigger mitigation model, the processor provides positive and/or negative training data to the false-trigger mitigation model. In some embodiments, the training data may include one or more of (i) a set of full-length audio samples, (ii) a set of chunk-wise utterances, and (iii) audio samples including one or more wake words or phrases. Any number of training samples can be used over the course of training, such as large numbers of training data (like using 80,000 full-length audio samples and 10,000 wake word/phrase audio samples). The processor receives outputs such as a class output and acoustic embeddings from the false-trigger mitigation model, an example of which is described with respect to FIG. 4. The processor, based on the output from the false-trigger mitigation model, determines an error or loss using a loss function and modifies the false-trigger mitigation model based on the error or loss. The outputs of the false-trigger mitigation model produced using the training input data can represent confidences regarding whether an utterance is an intentional utterance that invokes a wake word or phrase. The loss function calculates the error or loss associated with the false-trigger mitigation model's predictions. For example, when the outputs of the false-trigger mitigation model differ from the ground truths, the differences can be used to calculate a loss as defined by the loss function. The loss function may use any suitable measure of loss associated with outputs generated by the false-trigger mitigation model, such as a cross-entropy loss or a mean-squared error.

The processor determines whether the training of the false-trigger mitigation model is complete once the predictions provided by the false-trigger mitigation model are at an acceptable accuracy level. When the loss calculated by the loss function is larger than desired, the parameters of the false-trigger mitigation model can be adjusted. Once adjusted, the processor can provide the same or additional training data to the adjusted false-trigger mitigation model, and additional outputs from the false-trigger mitigation model can be compared to the ground truths so that additional losses can be determined using the loss function. Ideally, over time, the false-trigger mitigation model produces more accurate outputs that more closely match the ground truths, and the measured loss becomes less. At some point, the measured loss can drop below a specified threshold, at which point the training of the false-trigger mitigation model can be completed, and the method 600 moves to decision block 616.

At decision block 616, the processor determines whether to use an audio quality classification model, such as the audio quality classification model 304. In some embodiments, use of the audio quality classification model can be an optional step to filter out audio inputs that are below a quality threshold in order to ensure that good quality embedding vectors can be extracted from good quality audio. If, at decision block 616, it is determined that the audio quality classification model is to be used, the method 600 moves to block 618. If, at decision block 616, it is determined that the audio quality classification model is not to be used, the method 600 moves to block 620. At block 618, the processor trains the audio quality classification model to determine an audio quality score associated with an utterance. The training includes providing to the audio quality classification model positive and/or negative training samples such as clean audio sample data of a first predetermined duration and noisy audio sample data of a second predetermined duration. For example, during the course of training, the amount of training data used can vary depending on the number of training cycles, and can include larger amounts of training data, e.g., 14.5 hours of clean data and 14.5 hours of noisy data that contains 95,000 noise profiles in order to classify clean and noisy, that is, reliable and unreliable, data.

The processor, based on the output from the audio quality classification model, executes a loss function and modifies the audio quality classification model based on the loss function. The outputs of the audio quality classification model produced using the training input data can represent confidences regarding whether an audio is reliable or unreliable. The outputs are provided to a loss function, which calculates a loss associated with the audio quality classification model's predictions. For example, when the outputs of the audio quality classification model differ from the ground truths, the differences can be used to calculate a loss as defined by the loss function.

The loss function may use any suitable measure of loss associated with outputs generated by the audio quality classification model, such as a cross-entropy loss or a mean-squared error. The processor determines whether the training of the audio quality classification model is complete once the predictions provided by the audio quality classification model are at an acceptable accuracy level. When the loss calculated by the loss function is larger than desired, the parameters of the audio quality classification model can be adjusted. Once adjusted the processor can provide additional training data to the adjusted audio quality classification model, and additional outputs from the audio quality classification model can be compared to the ground truths so that additional losses can be determined using the loss function. Ideally, over time, the audio quality classification model produces more accurate outputs that more closely match the ground truths, and the measured loss becomes less. At some point, the measured loss can drop below a specified threshold, at which point the training of the audio quality classification model can be completed, and the method 600 moves to block 620. At block 620, after the training of the machine learning models is complete, the trained machine learning models are deployed onto a client electronic device, such as the electronic device 101. In some cases, the models can be deployed as lightweight models used to perform speaker verification during wake word detection.

Although FIGS. 6A and 6B illustrate one example of a method 600 for performing enrollment-less speaker verification training, various changes may be made to FIGS. 6A and 6B. For example, while shown as a series of steps, various steps in FIGS. 6A and 6B could overlap, occur in parallel, occur in a different order, or occur any number of times. As a particular example, blocks 602-610 could occur any number of times depending on the number of batches or epochs used to train the speaker verification model. Similarly, training steps encompassed within blocks 614 and 618 could be performed any number of times depending on the amount of training to be performed to train the false-trigger mitigation model and the audio quality classification model. Also, in some embodiments, the speaker verification model may not perform the comparison at block 612 and may be trained to output the similarities score (such as at block 606), and the processor may perform the comparison at block 612 using the similarity score output by the speaker verification model and based on the similarity threshold determined based on the number of utterances for the speaker (such as based on a clustering result as described in the embodiments of this disclosure).

Figure 7A:
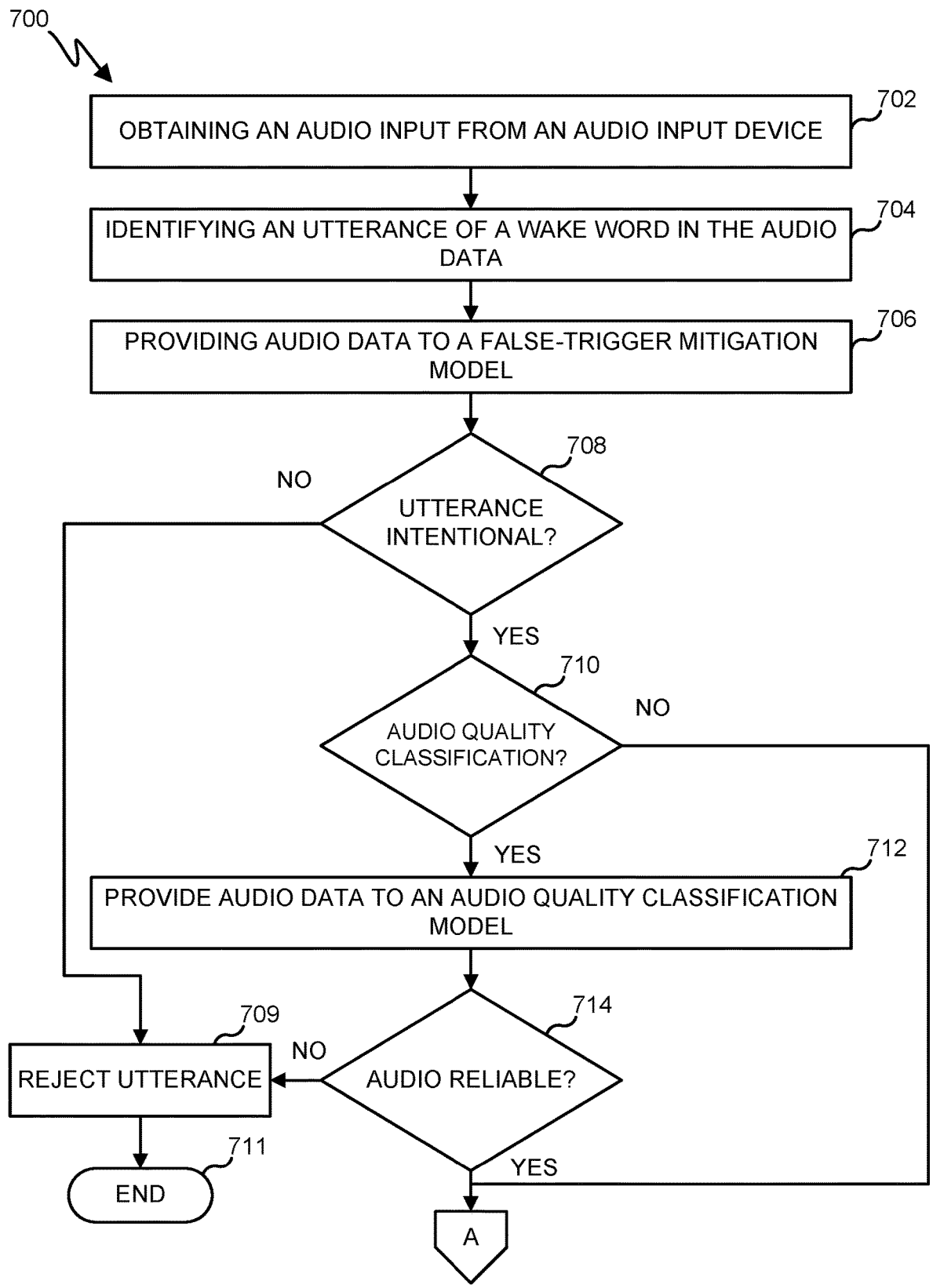
FIGS. 7A through 7C illustrate an example method for performing enrollment-less speaker verification in accordance with embodiments of this disclosure.
Figure 7B:
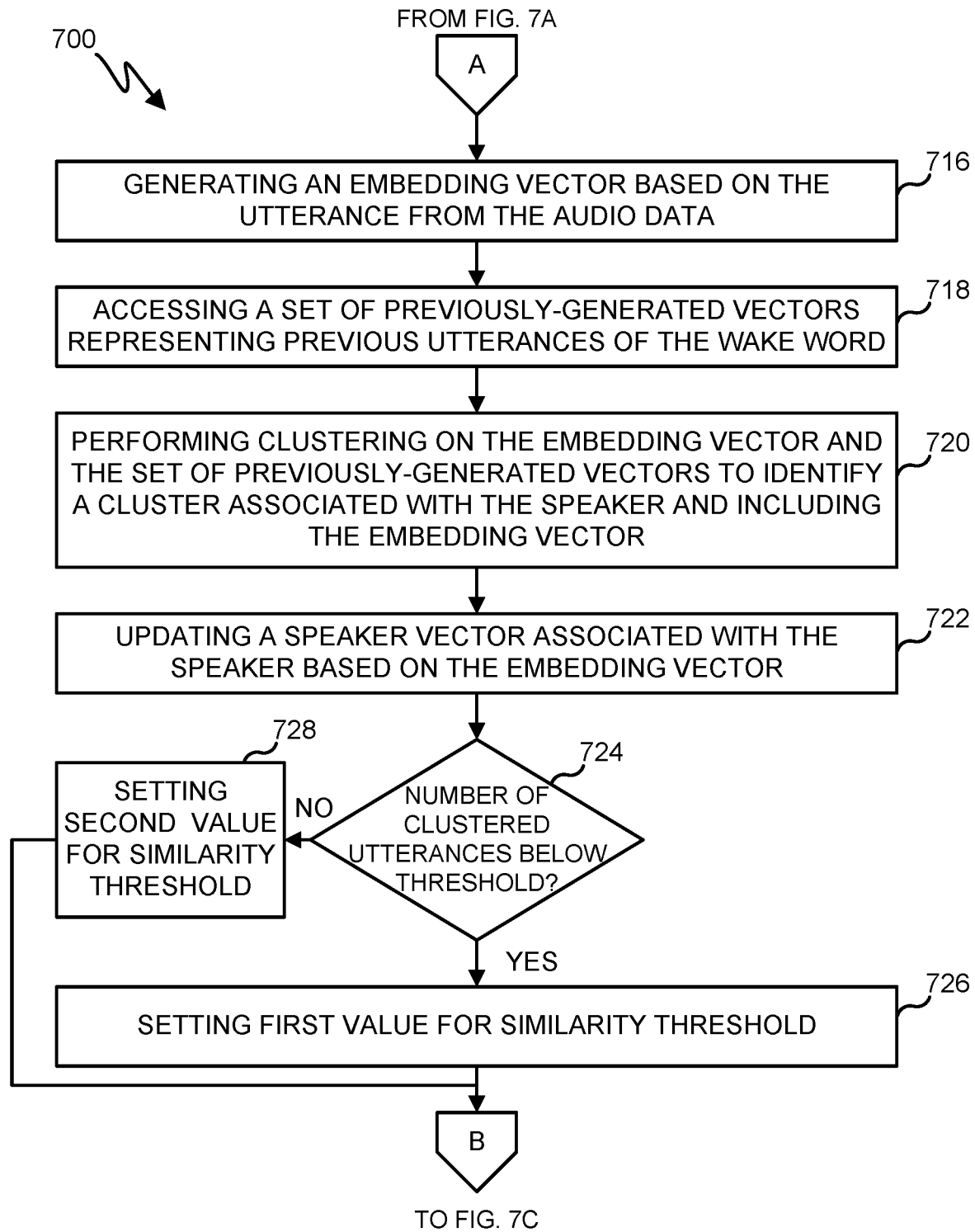
Figure 7C:
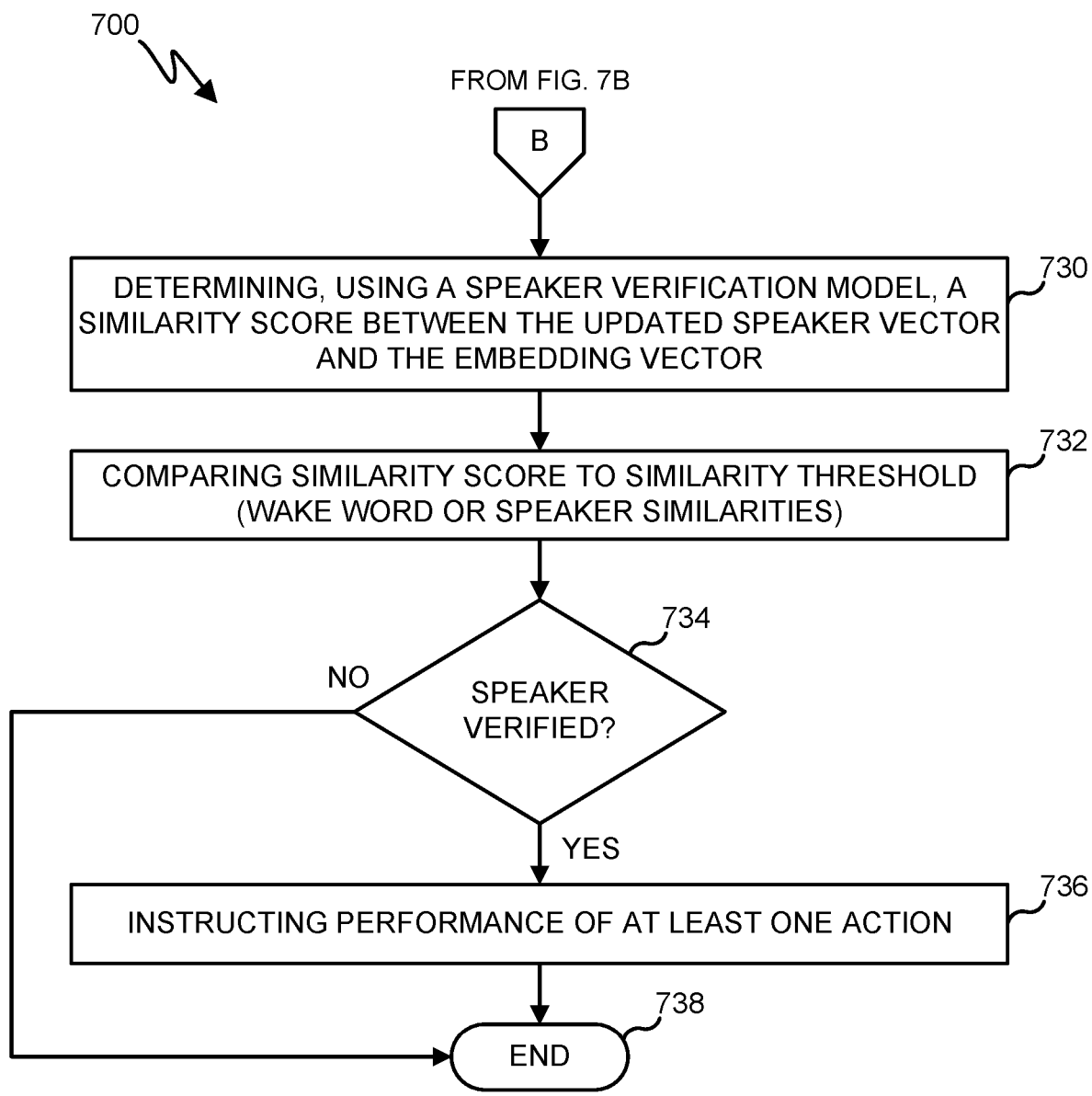

FIGS. 7A through 7C illustrate an example method 700 for performing enrollment-less speaker verification in accordance with embodiments of this disclosure. For ease of explanation, the method 700 shown in FIGS. 7A through 7C is described as being performed using the electronic device 101 in the network configuration 100 of FIG. 1. However, the method 700 could be performed using any other suitable device(s), such as the server 106, and in any other suitable system(s).

At block 702, the processor obtains audio data from an audio input device. At block 704, the processor identifies an utterance of a wake word or phrase in the audio data, such as by using a wake word detector model like the wake word detector model 202. At block 706, the processor provides the audio data to a false-trigger mitigation model, such as the false-trigger mitigation model 203. At decision block 708, the processor determines whether the utterance is classified as an intentional utterance or an unintentional utterance using the false-trigger mitigation model, such as based on a probability of the utterance being intentional being greater than an intention threshold value. If the processor determines the utterance is unintentional, the utterance is rejected at block 709, and the method 700 ends at block 711.

If the processor determines the utterance is intentional, the method 700 moves to decision block 710. At decision block 710, it is determined whether to use an audio quality classification model, such as the audio quality classification model 304. In some embodiments, use of the audio quality classification model can be an optional step to filter out audio inputs that are below a quality threshold (such as those that are too noisy) in order to ensure that good quality embedding vectors can be extracted from good quality audio. If it is determined that the audio quality classification model is not to be used, the method 700 moves on to block 716 to begin a process of clustering embedding vectors in response to the probability of the utterance being intentional being greater than an intention threshold value.

If it is determined that the audio quality classification model is to be used, the method 700 moves to block 712. At block 712, the processor provides audio data associated with the audio input to the audio quality classification model. At decision block 714, the processor determines whether the audio data is reliable or unreliable based on determining whether an audio quality score for the audio data as determined by the audio quality classification model is greater than an audio quality threshold. If the processor determines the audio data is unreliable, the utterance is rejected at block 709, and the method 700 ends at block 711. If the processor determines the audio is reliable, the method 700 moves to block 716 to begin a process of clustering embedding vectors in response to both the probability of the utterance being intentional being greater than the intention threshold and the audio quality score being greater than the audio quality threshold.

At block 716, the processor generates or extracts an embedding vector based on the utterance from the audio input data. At block 718, the processor accesses a set of previously-generated vectors representing previous utterances of the wake word or phrase. At block 720, the processor performs clustering on the embedding vector and the set of previously-generated vectors to identify a cluster including the embedding vector, where the identified cluster is associated with a particular speaker. At block 722, the processor updates a speaker vector associated with the speaker based on the embedding vector. At decision block 724, the processor determines if the number of clustered utterances for the speaker is below a threshold, such as a threshold of five, ten, or fifteen utterances (although any suitable number of utterances can be used for the threshold). If so, at block 726, the processor sets a similarity threshold to a first value, such as a lower threshold value like a value between 0.01-0.1. Otherwise, at block 728, the processor sets the similarity threshold to a second value, such as a higher threshold value like a value between 0.3-0.4. In this way, as described above, the method 700 can become more accurate in determining whether an utterance belongs to a particular user over time, as utterances from previous wake word detection and speaker verification processes can be used as feedback for subsequent wake word detection and speaker verification processes.

At block 730, the processor determines a similarity score between the updated speaker vector and the embedding vector using the speaker verification model, such as the speaker verification model 204. At block 732, the processor compares the similarity score with the similarity threshold that was set at block 726 or 728 to determine whether a speaker providing the utterance matches the speaker associated with the identified cluster. In various embodiments, when the lower first value is used for the similarity threshold value, the determining of the similarity score may essentially be performed using keyword verification to detect similarities between the wake word or phrase in the speaker vector and in the embedding vector. When the higher second value is used for the similarity threshold value, the determining of the similarity score may essentially be performed using speaker verification to detect similarities between the speaker providing the utterance and the speaker associated with the identified cluster.

At decision block 734, the processor determines, based on the comparison performed in block 732, whether the speaker that provided the audio data received at block 702 is a verified speaker in order to trigger one or more further actions based on the detected wake word/phrase and speaker verification. If the processor determines the speaker is not verified, the method 700 ends at block 738. If the processor determines the speaker is verified, the method 700 moves to block 736. At block 736, the processor instructs performance of at least one action. For example, the utterance may be transferred, such as to one or more on-device or server-side ASR/NLU models like the ASR/NLU model(s) 318, and subsequently at least one command included in the utterance can be fulfilled. For instance, the ASR/NLU model(s) can be used by the processor to further process the audio data and determine at least one command issued in the utterance, such as starting a timer, creating a reminder, initiating a phone call, etc. The processor can execute the determined command(s) in order to satisfy the user's intent.

Although FIGS. 7A through 7C illustrate one example of a method 700 for performing enrollment-less speaker verification, various changes may be made to FIGS. 7A through 7C. For example, while shown as a series of steps, various steps in FIGS. 7A through 7C could overlap, occur in parallel, occur in a different order, or occur any number of times. As a particular example, in some embodiments, the speaker verification model 204 may be used to perform all of blocks 716-734. In other embodiments, the processor may perform blocks 716-728, and the speaker verification model 204 may be used to perform the blocks 730-732 using the similarity threshold set by the processor at block 726 or 728. In still other embodiments, the speaker verification model 204 may not be used to perform the comparison at block 732 and may output the similarity score (such as at block 730), and the processor may perform the comparison at block 732 using the similarity score output by the speaker verification model 204 and based on the similarity threshold determined using the number of utterances for the speaker (such as based on a clustering result as described in the embodiments of this disclosure).

The method 700 may also be performed using a distributed architecture. For instance, the speaker verification model 204, the false-trigger mitigation model 203, and the audio quality classification model 304 can be executed on a client electronic device (such as electronic device 101) or at a server (such as server 106). In various embodiments, the ASR/NLU model(s) 318 can also be executed by the electronic device or by the server. When executed by the server, the server may provide the client electronic device with the determined action(s) to be performed by the client electronic device. In some embodiments, self-wake word verification can be performed by a server (such as the server 106), the client electronic device can provide audio data received via an audio input device of the client electronic device to the server, and the speaker verification model 204, the false-trigger mitigation model 203, the audio quality classification model 304, and the ASR/NLU model(s) 318 can be executed by the server based on the audio data provided from the client electronic device.

In addition, in some embodiments, additional steps can be performed to verify whether a valid wake up based on the speaker was performed. For example, after the method 700 shown in FIGS. 7A through 7C is performed, a prompt can be issued to a user of the electronic device to ask the user if the latest utterance was from that user. In some embodiments, the user can also be determined or weighted based on a most active user of the electronic device. Also, in some cases, predictions can take into account voice assistant use patterns, such as if a particular user is allowed to unlock the electronic device.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
obtaining, using at least one processing device of an electronic device, audio data;
identifying, using the at least one processing device, an utterance of a wake word or phrase in the audio data;
generating, using the at least one processing device, an embedding vector based on the utterance from the audio data;
accessing, using the at least one processing device, a set of previously-generated vectors representing previous utterances of the wake word or phrase;
performing, using the at least one processing device, clustering on the embedding vector and the set of previously-generated vectors to identify a cluster including the embedding vector, the identified cluster associated with a speaker;
updating, using the at least one processing device, a speaker vector associated with the speaker based on the embedding vector;
determining, using the at least one processing device and a speaker verification model, a similarity score between the updated speaker vector and the embedding vector; and
determining, using the at least one processing device and based on the similarity score, whether a speaker providing the utterance matches the speaker associated with the identified cluster, including comparing, using the at least one processing device, the similarity score to a similarity threshold value, wherein a first value is used for the similarity threshold value based on the identified cluster including fewer than a threshold number of utterances.

2. The method of claim 1, wherein a second value greater than the first value is used for the similarity threshold value when the identified cluster includes at least the threshold number of utterances.

3. The method of claim 2, wherein:
when the first value is used for the similarity threshold value, the determining of the similarity score is performed using keyword verification to detect similarities between the wake word or phrase in the speaker vector and in the embedding vector; and
when the second value is used for the similarity threshold value, the determining of the similarity score is performed using speaker verification to detect similarities between the speaker providing the utterance and the speaker associated with the identified cluster.

4. The method of claim 1, further comprising:
determining, using the at least one processing device, a probability that the utterance is an intentional utterance; and
performing the clustering, using the at least one processing device, in response to the probability being greater than an intention threshold value.

5. The method of claim 4, further comprising:
training, using the at least one processing device, a false-trigger mitigation model to determine the probability that the utterance is an intentional utterance, wherein training the false-trigger mitigation model includes:

providing, to the false-trigger mitigation model using the at least one processing device, one or more of (i) a set of full-length audio samples, (ii) a set of chunk-wise utterances, and (iii) audio samples including one or more wake words or phrases.

6. The method of claim 4, further comprising:
in response to the probability being greater than the intention threshold value, determining, using the at least one processing device, an audio quality score associated with the utterance; and
performing the clustering, using the at least one processing device, in response to the audio quality score being greater than an audio quality threshold.

7. The method of claim 6, further comprising:
training, using the at least one processing device, an audio quality classification model to determine the audio quality score associated with the utterance, wherein training the audio quality classification model includes:
providing, to the audio quality classification model using the at least one processing device, clean audio sample data of a first predetermined duration and noisy audio sample data of a second predetermined duration.

8. The method of claim 1, further comprising:
training, using the at least one processing device, the speaker verification model, wherein training the speaker verification model includes:
providing a sample embedding vector based on an utterance from sample audio data, wherein the utterance includes the wake word or phrase;
providing, using the at least one processing device, a sample speaker vector;
receiving, using the at least one processing device from the speaker verification model, a result including a similarity score between the sample speaker vector and the sample embedding vector; and
using a loss function and modifying the speaker verification model based on the result.

9. The method of claim 1, further comprising instructing, by the at least one processing device, performance of at least one action based on a determination that the speaker providing the utterance matches the speaker associated with the identified cluster.

10. The method of claim 9, wherein instructing the performance of the at least one action includes transferring the utterance to an automated speech recognition model or a natural language understanding model.

11. An apparatus comprising:
at least one processing device configured to:
obtain audio data;
identify an utterance of a wake word or phrase in the audio data;
generate an embedding vector based on the utterance from the audio data;
access a set of previously-generated vectors representing previous utterances of the wake word or phrase;
perform clustering on the embedding vector and the set of previously-generated vectors to identify a cluster including the embedding vector, the identified cluster associated with a speaker;
update a speaker vector associated with the speaker based on the embedding vector;
determine, using a speaker verification model, a similarity score between the updated speaker vector and the embedding vector; and
determine, based on the similarity score, whether a speaker providing the utterance matches the speaker associated with the identified cluster, wherein the at least one processing device is further configured to compare the similarity score to a similarity threshold value, wherein a first value is used for the similarity threshold value based on the identified cluster including fewer than a threshold number of utterances.

12. The apparatus of claim 11, wherein a second value greater than the first value is used for the similarity threshold value when the identified cluster includes at least the threshold number of utterances.

13. The apparatus of claim 12, wherein:
when the first value is used for the similarity threshold value, the determination of the similarity score is based on using keyword verification to detect similarities between the wake word or phrase in the speaker vector and in the embedding vector; and
when the second value is used for the similarity threshold value, the determination of the similarity score is based on using speaker verification to detect similarities between the speaker providing the utterance and the speaker associated with the identified cluster.

14. The apparatus of claim 11, wherein the at least one processing device is configured to:
determine a probability that the utterance is an intentional utterance; and
perform the clustering in response to the probability being greater than an intention threshold value.

15. The apparatus of claim 14, wherein the at least one processing device is configured to:
in response to the probability being greater than the intention threshold value, determine an audio quality score associated with the utterance; and
perform the clustering in response to the audio quality score being greater than an audio quality threshold.

16. A non-transitory computer readable medium containing instructions that when executed cause at least one processor to:
obtain audio data;
identify an utterance of a wake word or phrase in the audio data;
generate an embedding vector based on the utterance from the audio data;
access a set of previously-generated vectors representing previous utterances of the wake word or phrase;
perform clustering on the embedding vector and the set of previously-generated vectors to identify a cluster including the embedding vector, the identified cluster associated with a speaker;
update a speaker vector associated with the speaker based on the embedding vector;
determine, using a speaker verification model, a similarity score between the updated speaker vector and the embedding vector; and
determine, using based on the similarity score, whether a speaker providing the utterance matches the speaker associated with the identified cluster, including computer readable medium containing instructions that when executed cause the at least one processor to compare the similarity score to a similarity threshold value, wherein a first value is used for the similarity threshold value based on the identified cluster including fewer than a threshold number of utterances.

17. The non-transitory computer readable medium of claim 16, wherein a second value greater than the first value is used for the similarity threshold value when the identified cluster includes at least the threshold number of utterances.

18. The non-transitory computer readable medium of claim 16, further containing instructions that when executed cause the at least one processor to:
- determine a probability that the utterance is an intentional utterance;
- in response to the probability being greater than an intention threshold value, determine an audio quality score associated with the utterance; and
- perform the clustering in response to the probability being greater than the intention threshold value and in response to the audio quality score being greater than an audio quality threshold.

19. The apparatus of claim 11, wherein the at least one processing device is configured to instruct performance of at least one action based on a determination that the speaker providing the utterance matches the speaker associated with the identified cluster.

20. The apparatus of claim 19, wherein, to instruct the performance of the at least one action, the at least one processing device is configured to transfer the utterance to an automated speech recognition model or a natural language understanding model.

* * * * *